(12) United States Patent
Schmitt et al.

(10) Patent No.: US 10,845,520 B2
(45) Date of Patent: Nov. 24, 2020

(54) OPTICAL DEVICES WITH PATTERNED ANISOTROPY INCORPORATING PARALLAX OPTIC

(71) Applicant: ROLIC AG, Zug (CH)

(72) Inventors: Klaus Schmitt, Lorrach (DE); Hubert Seiberle, Weil am Rhein (DE); David Pires, Allschwil (CH)

(73) Assignee: ROLIC AG, Zug (CH)

( * ) Notice: Subject to any disclaimer, the term of this patent is extended or adjusted under 35 U.S.C. 154(b) by 606 days.

(21) Appl. No.: 15/129,882

(22) PCT Filed: Mar. 30, 2015

(86) PCT No.: PCT/EP2015/056826
§ 371 (c)(1),
(2) Date: Sep. 28, 2016

(87) PCT Pub. No.: WO2015/150295
PCT Pub. Date: Oct. 8, 2015

(65) Prior Publication Data
US 2017/0139093 A1     May 18, 2017

(30) Foreign Application Priority Data

Apr. 3, 2014  (EP) .................................. 14163316

(51) Int. Cl.
*G02B 5/30* (2006.01)
*G02B 30/25* (2020.01)
(Continued)

(52) U.S. Cl.
CPC ...... *G02B 5/3016* (2013.01); *B29D 11/00644* (2013.01); *B42D 25/364* (2014.10);
(Continued)

(58) Field of Classification Search
None
See application file for complete search history.

(56) References Cited

U.S. PATENT DOCUMENTS 4,122,027 A    10/1978  Cole, Jr. et al.
4,401,369 A     8/1983  Jones
(Continued)

FOREIGN PATENT DOCUMENTS

CN    103581643 A    2/2014
EP    2 759 855 A1   7/2014
(Continued)

OTHER PUBLICATIONS

International Search Report for PCT/EP2015/056826 dated Jun. 11, 2015.
(Continued)

*Primary Examiner* — Edward J Glick
*Assistant Examiner* — Anthony G Quash
(74) *Attorney, Agent, or Firm* — Sughrue Mion, PLLC

(57) ABSTRACT

The invention provides a method for generation of an orientation pattern in a photo-alignable material using parallax optic. The invention further provides optical devices comprising a parallax optical element and an element with patterned optical anisotropic properties. Such devices have angular dependent, optically anisotropic properties, which are useful for various applications.

16 Claims, 8 Drawing Sheets

(51) Int. Cl.
  *G02B 30/27* (2020.01)
  *B42D 25/364* (2014.01)
  *B42D 25/445* (2014.01)
  *B29D 11/00* (2006.01)
  *B29K 105/00* (2006.01)

(52) U.S. Cl.
  CPC ......... *B42D 25/445* (2014.10); *G02B 5/3083* (2013.01); *G02B 30/25* (2020.01); *G02B 30/27* (2020.01); *B29K 2105/0058* (2013.01); *B29 2995/0044* (2013.01)

(56) References Cited

U.S. PATENT DOCUMENTS

| | | | |
|---|---|---|---|
| 4,565,424 A | 1/1986 | Huffman et al. | |
| 4,667,020 A | 5/1987 | Etzbach et al. | |
| 5,389,285 A | 2/1995 | Shannon et al. | |
| 5,539,074 A | 7/1996 | Herr et al. | |
| 5,909,265 A * | 6/1999 | Kim | G02F 1/133753 349/129 |
| 6,107,427 A | 8/2000 | Herr et al. | |
| 6,201,087 B1 | 3/2001 | Herr et al. | |
| 6,479,218 B1 * | 11/2002 | Choi | G02F 1/133753 349/124 |
| 6,632,909 B2 | 10/2003 | Buchecker et al. | |
| 6,734,936 B1 | 5/2004 | Schadt et al. | |
| 7,375,888 B2 | 5/2008 | Moia | |
| 7,959,990 B2 | 6/2011 | Cherkaoui et al. | |
| 8,922,757 B2 * | 12/2014 | Tseng | H01J 9/24 349/124 |
| 2004/0021821 A1 * | 2/2004 | Tillin | G02B 27/286 349/177 |
| 2006/0227272 A1 * | 10/2006 | Chida | G02F 1/1303 349/135 |
| 2007/0058258 A1 * | 3/2007 | Mather | G02B 27/2214 359/619 |
| 2012/0164345 A1 * | 6/2012 | Lee | G02B 5/3083 427/542 |
| 2012/0169949 A1 * | 7/2012 | Son | G02B 6/0056 349/15 |
| 2012/0182517 A1 * | 7/2012 | Su | G02B 5/3016 349/191 |
| 2013/0169896 A1 * | 7/2013 | Iwahashi | B41M 3/06 349/15 |
| 2013/0314790 A1 | 11/2013 | Kim et al. | |
| 2013/0342797 A1 * | 12/2013 | Chiou | G02F 1/133528 349/123 |
| 2014/0036360 A1 | 2/2014 | Sakamoto et al. | |
| 2014/0130968 A1 * | 5/2014 | Hung | G02B 5/3016 156/247 |
| 2014/0185000 A1 * | 7/2014 | Takahashi | G07D 7/00 349/194 |
| 2015/0192830 A1 * | 7/2015 | Kajiyama | G02F 1/133788 250/492.1 |

FOREIGN PATENT DOCUMENTS

| | | | |
|---|---|---|---|
| GB | 2 405 543 A | | 3/2005 |
| JP | 2001525080 A | | 12/2001 |
| JP | 2005-78091 A | | 3/2005 |
| JP | 2011176525 A * | 9/2011 | .............. H04N 5/335 |
| WO | 2013/042737 A1 | | 3/2013 |

OTHER PUBLICATIONS

Notification of Reasons for Refusal dated Feb. 5, 2019 from the Japanese Patent Office in application No. 2016-560560.

* cited by examiner

OPTICAL DEVICES WITH PATTERNED ANISOTROPY INCORPORATING PARALLAX OPTIC

CROSS REFERENCE TO RELATED APPLICATIONS

This application is a National Stage of International Application No. PCT/EP2015/056826 filed Mar. 30, 2015, claiming priority based on European Patent Application No. 14163316.4 filed Apr. 3, 2014, the contents of all of which are incorporated herein by reference in their entirety.

TECHNICAL FIELD

The invention relates to a method for generation of an orientation pattern in a photo-alignable material using parallax optic. The invention further relates to optical devices with patterned anisotropic properties and parallax optic. The devices according to the invention have angular dependent, optically anisotropic properties, which are useful for various applications.

BACKGROUND OF THE INVENTION

Elements with patterned anisotropic properties are, for example, known as optical elements, which include a layer comprising polymerized or cross-linked liquid crystals with locally different optical axes directions. Such layers are, for example, prepared by applying cross-linkable liquid crystal materials on top of an alignment layer exhibiting locally different alignment directions. The liquid crystal material adopts the local alignment direction of the underlying alignment layer and is then cross-linked to fix the orientation.

Optical elements of that kind are produced in large quantities and are mainly used for polarization conversion in passive 3D-displays to encode picture information for the left and right eyes of a viewer.

There are different methods known in the art to generate an orientation pattern in a layer of a photo-alignable material. In general, an orientation pattern is achieved by exposing different regions of a photo-alignment layer to aligning light with different polarization directions. For example, in U.S. Pat. No. 7,375,888 this is done by covering part of the photo-alignment layer by different photo-masks in subsequent exposure steps, each using its own polarization direction.

In U.S. Pat. No. 7,375,888 optical elements with a layer comprising patterned anisotropy are disclosed, in which at least two images are stored, such that the images can be seen one after the other by rotating an analyzer. The images are, for example, contained in alternate stripes within the layer with patterned anisotropy. The method for the manufacturing of such elements, as described in U.S. Pat. No. 7,375,888, comprises subsequent exposure steps with individual optical masks, which requires exact alignment of the masks in order to transfer the individual images to the corresponding dedicated stripes.

SUMMARY OF THE INVENTION

An object of the present invention is to provide a simplified method for the generation of an orientation pattern in a layer comprising a photo-alignable material. Another object of the present invention is to provide novel optical devices comprising anisotropic properties.

In the method according to the invention parallax optic is used to direct aligning light to certain regions of a photo-alignment layer in order to generate anisotropy in the corresponding regions. Different regions are selected by the angle of incidence of the aligning light with regard to the parallax optical element. Aligning light of different incidence angles may be applied in subsequent exposure steps or simultaneously, for example, by using non-collimated light. This allows to generate an alignment pattern in a photo-alignment layer, for example in the form of stripes, just by irradiation from different angles without replacing or repositioning of photo-masks.

Parallax optic is well known in the art and is often employed for steering light into certain viewing areas in order to separate different view images. Applications are, for example, in autostereoscopic displays or in flip pictures with interlaced images, where the different images can be seen by changing the viewing angle.

In the context of this invention the term parallax optical element is used for those optical elements, which provide the parallax optic and have the property to steer light to different regions as a function of the incidence angle. Examples of parallax optical elements are parallax barriers, lenticular lens arrays, grating plates and microlens arrays. In the following the term POE is used as an abbreviation for a parallax optical element.

Devices according to the invention comprise a POE and an optical element with patterned optical properties. The pattern comprises at least one zone, in which the optical property is anisotropic. However, there may be zones in the pattern without any anisotropic property. Properties which may be anisotropic include absorption, scattering, reflection, luminescence and refractive index. Preferably, there are at least two zones with anisotropic properties, which differ in the orientation direction of the symmetry axis of the anisotropic property. For uniaxial anisotropic properties the symmetry axis is well defined, such as the optical axis in case of a uniaxial retarder. Another example is the extinction axis in case of a polarizing layer. In case the anisotropy is biaxial, such as in a biaxial retarder, the term symmetry axis shall refer to one of the main axes. The POE and the optical element are arranged behind each other, such that they at least partially overlap with each other. The devices of the invention use parallax optic to select specific regions of the pattern of the optical element for interaction with incident light. The light may be incident to the device from the optical element side or from the POE side.

In the context of this application the term "orientation direction" shall refer to the symmetry axis of the anisotropic property. The term "orientation pattern" shall mean a pattern comprising at least two areas which differ in the orientation direction.

An orientation pattern in an optical element with patterned optical properties has preferably been generated by a photo-alignment method in a layer comprising a photo-alignable material. Alternatively, the orientation pattern may also have been generated by other suitable methods, for example by imprinting, brushing, photolithography or other methods for generating an anisotropic surface structure.

BRIEF DESCRIPTION OF THE DRAWINGS

The invention is further illustrated by the accompanying drawing figures. It is emphasized that the various features are not necessarily drawn to scale.

DETAILED DESCRIPTION OF THE INVENTION

Figure 1A:
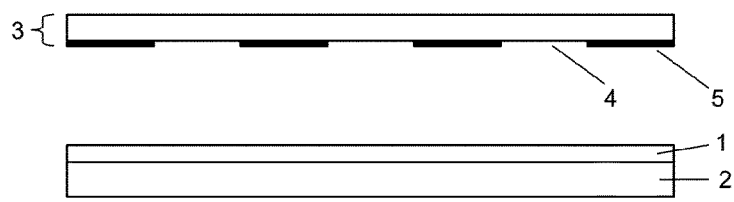
FIG. 1 depicts steps of a method according to the invention, which shows the arrangement of a parallax barrier plate and of a photo-alignment layer in FIG. 1a, a first irradiation from a first incident direction in FIG. 1b, a second irradiation from a second incident direction in FIG. 1c as well the generated orientation pattern in FIG. 1d.

According to a first aspect of the invention, there is provided a method for the generation of an orientation pattern in a photo-alignment layer.

The method of the invention comprises the steps of
providing a photo-alignment layer
providing a parallax optical element
arranging the parallax optical element in a proper distance from the photo-alignment layer
irradiation of the parallax optical element with aligning light of a first polarization direction under a first incidence angle with regard to a reference plane of the parallax optical element such that the aligning light is directed to first regions on the surface of the photo-alignment layer in order to induce anisotropy in the first regions of the photo-alignment layer.

In the context of the present application, the term photo-alignment layer is used for a layer which comprises a photo-alignable and/or photo-aligned material, no matter if it has already been exposed to aligning light or not. Accordingly, a photo-alignment layer, as used herein, may have no anisotropic property as long as it has not been exposed to aligning light and has anisotropic property after it has been exposed to aligning light. A photo-alignment layer may be applied to a substrate as a thin layer. It is also possible that the photo-alignment layer is thick and mechanically stable enough, such that it can be handled without an additional support. In the latter case, the photo-alignment layer has also the function of a substrate.

A photo-alignable material is a material which is sensitive to the polarization of light and in which anisotropic properties can be induced upon exposure to polarized light of a proper wavelength. The term "photo-aligned material" is used to refer to a photo-alignable material that has been aligned by exposure to aligning light.

In the context of the present application, the term "aligning light" shall mean light, which can induce anisotropy in a photo-alignable material and which is at least partially linearly or elliptically polarized. In case the aligning light is elliptically polarized, the polarization direction shall be the major axis of the polarization ellipse. Preferably, the aligning light is linearly polarized with a degree of polarization of more than 5:1. Wavelengths, intensity and energy of the aligning light are chosen depending on the photosensitivity of the photo-alignable material. Typically, the wavelengths are in the UV-A, UV-B and/or UV-C range or in the visible range. Preferably, the aligning light comprises light of wavelengths less than 450 nm. More preferred is that the aligning light comprises light of wavelengths less than 400 nm.

The methods and devices of the present invention make use of a POE. A first type of suitable POEs includes focusing elements like lenses and arrays of lenses, in particular microlenses and lenticular lenses, which focus the transmitted light into certain regions in the focal plane of the lenses. Upon changing the incidence angle of the light, the regions to which the light is projected move correspondingly. The POE may also comprise optically anisotropic lenses, preferably these are optically anisotropic lenticular lenses.

Another type of POEs are parallax barrier plates, which comprise a plurality of light transmitting sections, separated by light blocking sections. Preferably, the sections have the form of stripes. If a parallax barrier plate is arranged at a distance from a screen and is illuminated obliquely, the light transmitting sections are projected to the screen with a parallax. Because the parallax depends on the incidence angle of the light, the illuminated regions on the screen move as a function of the incidence angle of the light. Typically, the light blocking sections are arranged on a support and may absorb and/or reflect the light. For operation in transmission the support has to be transmissive, whereas this is not required if operated in reflection. A POE may comprise one or more parallax barrier plates. If the POE comprises two or more parallax barrier plates, they are preferably arranged at a distance from each other, such that incident light which passes the first barrier plate is further steered into a certain direction because other directions may be blocked by light blocking section of a second barrier plate. For example, this allows to increase the collimation degree of the light. It is, for example, possible to have parallax barrier plates on both sides of a transparent substrate, but it is also possible that the parallax barrier plates are physically separated from each other. Any method known in the art can be used to generate the light blocking sections, for example by printing or by other methods for local material deposition. Alternatively, the light blocking material may first be applied over an area larger than that desired for the light blocking sections and subsequently be removed by proper means, such as dry or wet etching, local ablation or de-metallization. As an alternative, the light transmissive sections may also be areas in which the material has been removed in the full depth of a light absorbing or reflecting plate, thereby creating holes.

In a parallax barrier plate used in the methods and the devices of the invention, the width of the light transmissive and light blocking sections may be the same or different from each other. If only two kinds of regions have to be distinguished in the photo-alignment layer (method) or the element with patterned optical property (device), respectively, by different incidence angles, then the width of the light transmissive and light blocking sections is preferably identical. If more than two regions are to be addressed by more than two incidence angles, then the width of the light blocking sections is preferably broader than that of the transmissive sections. Preferably, the ratio of the width of a light blocking section to the sum of the width of a light blocking and a light transmissive section is 0.6 or higher, more preferred 0.7 or higher and most preferred 0.8 or higher.

In order to provide a sufficient parallax effect in a reasonable range of incidence angles for the method of the invention, a parallax plate should have a proper distance from the photo-alignment layer. The proper distance depends on the width of the light transmissive and light blocking sections of the parallax plate. If the space between the parallax plate and the photo-alignment layer is filled with air, then the distance between the parallax plate and the photo-alignment layer is preferably larger than 0.2 times the width of a light transmissive section of the parallax plate. More preferred is that the distance is larger than 0.4 times the width of a light transmissive section and most preferred larger than 0.6 times the width of a light transmissive section of the parallax plate. If there is a dielectric material between the parallax plate and the photo-alignment layer, such as glass or plastic, then the distance between the parallax plate and the photo-alignment layer is preferably larger than 0.5 times the width of a light transmissive section of the parallax plate. More preferred is that the distance is larger than 0.8 times the width of a light transmissive section and most preferred larger than one time the width of a light transmissive section of the parallax plate.

Still another example of a POE comprises a diffractive structure, such as a grating plate. The diffracted light impinges only into certain regions of a screen positioned at a distance from the device. Because light diffraction depends on the incidence angle of the light, the regions on the screen to which light is diffracted change their position as a function of the incidence angle of the light.

Ideally, a POE used in the method and in the devices of the invention does not affect the polarization state of the aligning light. Hence, the materials used in the POEs preferably have low or no optical birefringence.

The photo-alignment layer may be attached to the POE or may be separated from the POE. In the latter case the photo-alignment layer and the POE can be moved and positioned independently from each other. Further, if the photo-alignment layer is separated from the POE there is the advantage that the POE can be used for the method of the invention many times.

Preferably, the photo-alignment layer is combined with the POE. This is particularly advantageous, if the photo-alignment layer will be used for manufacturing of an element for a device according to the invention. Because the POE is combined with the photo-alignment layer, the pattern generated in the photo-alignment layer by irradiation through the POE is already perfectly aligned with the POE. The same POE is therefore used in the method for generating the pattern and in the device for analyzing the pattern.

When combining the POE and the photo-alignment layer there should be a proper distance between the optically active part of the POE and the surface of the photo-alignment layer. For this purpose the POE may be provided as a device with a thickness such that when the photo-alignment layer is applied to the desired surface of the POE device, it has the proper distance from the POE. Alternatively, additional layers may be applied to the side of the POE to which the photo-alignment layer is intended to be applied in order to provide the proper distance. The photo-alignment layer may be directly created on the POE, for example, by coating or printing. Alternatively, a substrate with a photo-alignment layer or a substrate comprising a photo-alignable material may be laminated to the POE. In case the POE is a microlens array or a lenticular lens array then for many applications the photo-alignment layer is preferably positioned in the focal plane of the lens array.

Preferably, the method of the invention comprises an additional step, in which, without changing the mutual position and orientation of photo-alignment layer and parallax optical element, the parallax optical element is irradiated with aligning light under a second incidence angle with regard to a reference plane of the parallax optical element such that the aligning light is directed to second regions on the surface of the photo-alignment layer, where it creates anisotropy. Additional exposure steps may be added, in which aligning light is incident under additional angles in order to generate alignment in additional regions. The polarization directions of the aligning light may be the same in each of the exposure steps or they may differ in two or more of the exposure steps. For each of the above exposures the relative position and orientation between alignment layer and parallax optical element is the same.

The first and second incidence angle shall be different from each other. Accordingly, the first and second regions are not identical. Although there may be some overlap of the regions, there is at least part of the second regions, which does not overlap with areas of the first regions. The total area of the part of the second regions that overlap with areas of the first regions is preferably less than 50%, more preferred less than 30% and most preferred less than 10% of the total area of the second regions.

Preferably, there is one exposure step, in which aligning light is irradiated to the photo-alignment layer without passing the POE. The aligning light may be irradiated to the same side of the photo-alignment layer which is also irradiated through the POE. Preferably, the aligning light is irradiated to the side of the photo-alignment layer, which is opposite to that irradiated through the POE. The aligning light may be irradiated to the full area of the photo-alignment layer or only to certain zones of it. It is further possible to add one or more subsequent steps, in which further zones of the photo-alignment layer are irradiated with aligning light of different polarization directions. In order to define the zones to be irradiated in these exposure steps, photomasks can, for example, be used. Preferably, the polarization directions of the aligning light used for irradiation without the POE are different from each of those used for irradiation through the POE. The exposure steps with and without the POE may be in any sequence. For example, the first exposure step may be without the POE, followed by exposure steps with POE. Preferably, there is an exposure step without a POE after the last exposure step with a POE.

Figure 1B:
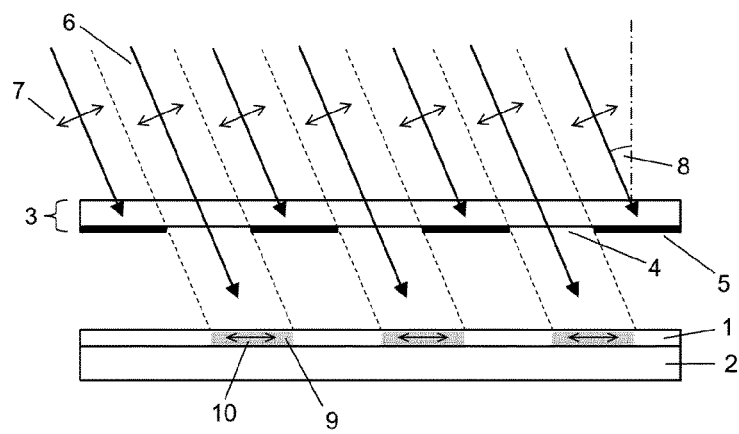
Figure 1C:
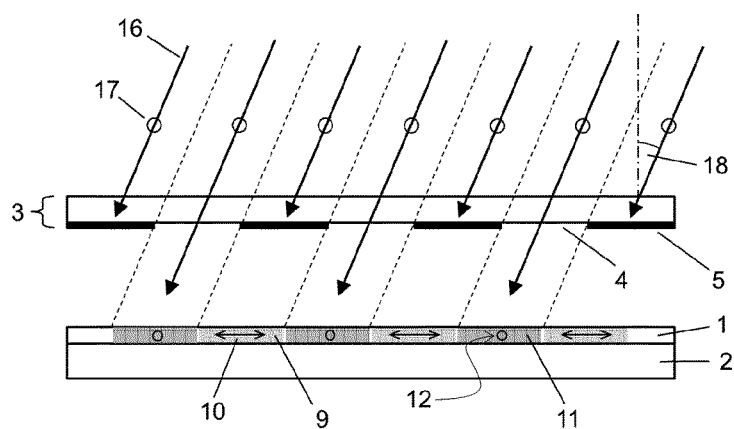
Figure 1D:
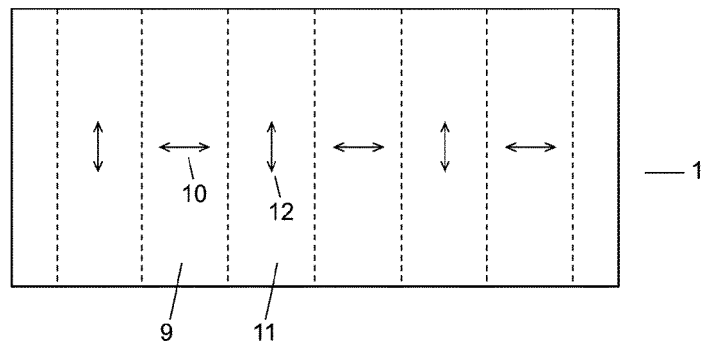

The drawings of FIGS. 1a to 1d depict an example of a method according to the invention. In FIG. 1a a parallax barrier plate is used as a POE 3, which is arranged at a distance from a photo-alignment layer 1 on a substrate 2. The parallax barrier plate has stripes of a light blocking material on a transparent support, which results in light blocking stripes 5 and transparent stripes 4. In FIG. 1b, collimated aligning light 6 is incident to the POE under a first incident angle 8, with regard to the normal of the POE surface. The polarization direction 7 of the aligning light is assumed to lie in the drawing plane. Because the light is blocked in the areas 5, the light transmitted through the transparent sections 4 creates anisotropy with an orientation direction 10 only in the first regions 9 of the photo-alignment layer. Although the drawing indicates that the orientation direction lies in the plane of the drawing, it is appreciated that it is also possible that the orientation is perpendicular to the drawing plane, which depends on the type of photo-alignable material used in the photo-alignment layer. FIG. 1c illustrates a second irradiation with collimated aligning light 16 with a second polarization direction 17 incident under a second incidence angle 18. The polarization direction is assumed to be perpendicular to the drawing plane, as indicated by the circles 17. Because of the parallax, aligning light transmitted through the transparent stripes 4 of the POE irradiate second regions 11 and create anisotropy in the photo-alignment layer 1 with an orientation direction 12 perpendicular to the orientation direction 10 created in the first regions 9. As a result, an orientation pattern is created in the photo-alignment layer 1 having stripes 9 and 11 with orientation directions 10 and 12, respectively, which are perpendicular to each other, as shown in FIG. 1d. The two specific polarization directions of the aligning light in the two irradiation steps have been chosen for ease of illustration. However, any other combination of polarization directions may be chosen, in particular the two polarization directions do not need to be perpendicular to each other.

Figure 2A:
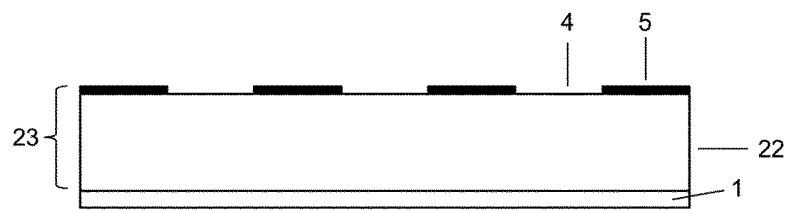
FIG. 2 depicts steps of a variant of the method according to the invention, which shows in FIG. 2a a parallax barrier element to which a photo-alignment layer is attached, a first irradiation from a first incident direction in FIG. 2b, a second irradiation from the side opposite of the parallax barrier plate in FIG. 2c as well the generated orientation pattern in FIG. 2d.
Figure 2B:
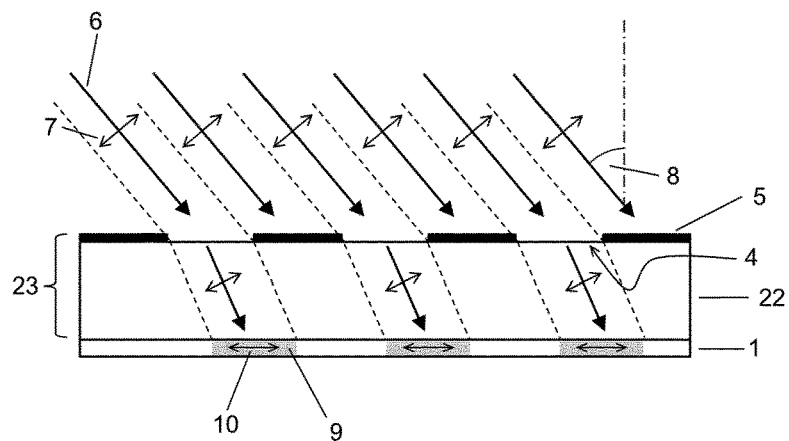
Figure 2C:
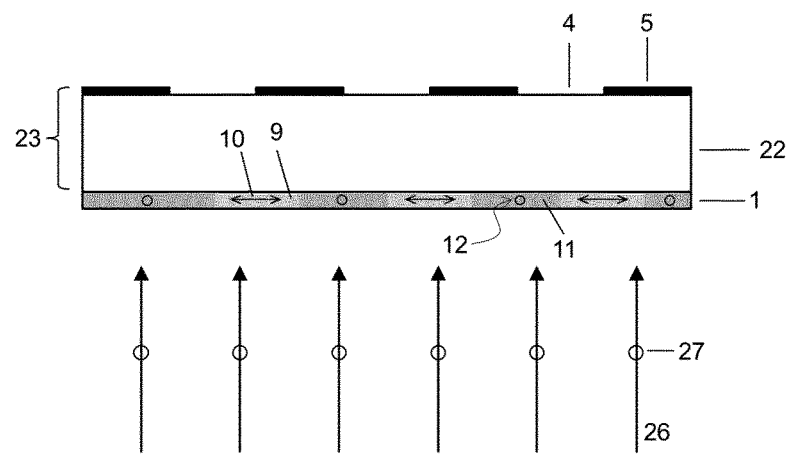
Figure 2D:
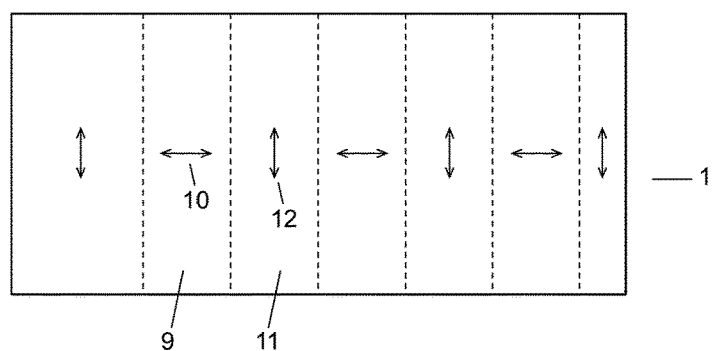
Figure 3A:
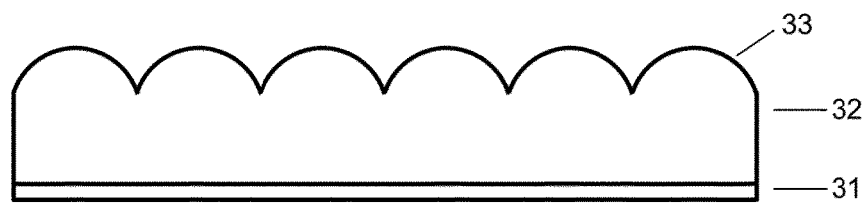
FIG. 3 illustrates steps of an example of the method, depicted in FIGS. 3a to 3e, wherein a photo-alignment layer is combined with a POE comprising an array of lenticular lenses.
Figure 3B:
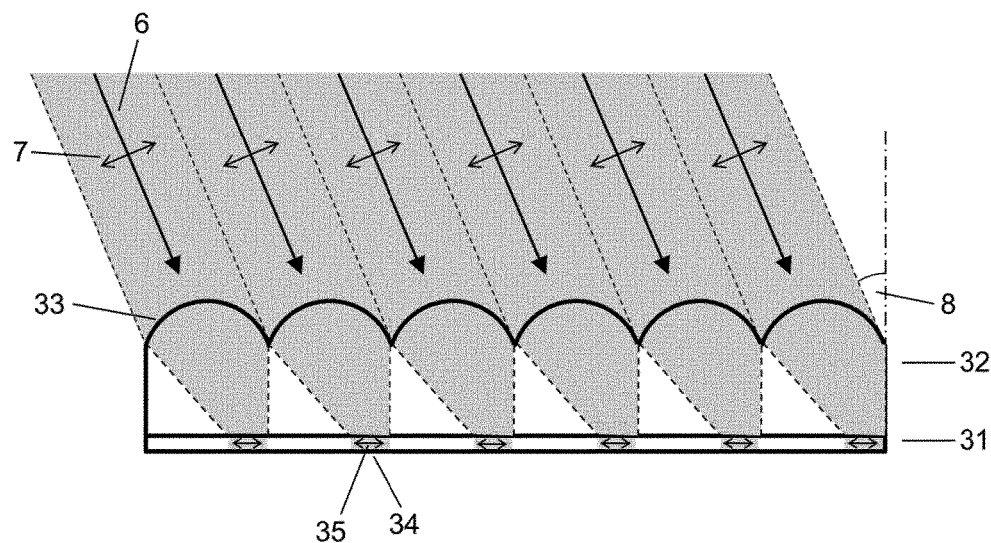
Figure 3C:
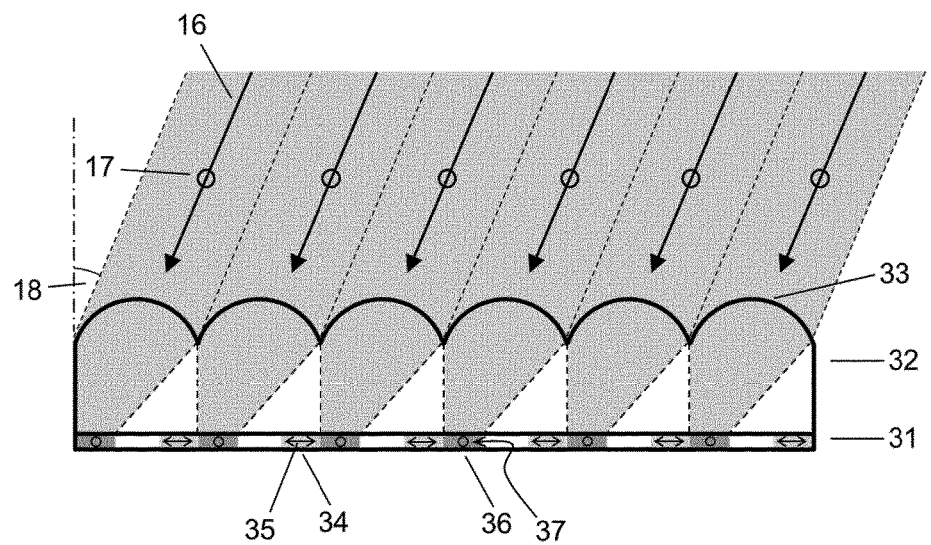
Figure 3D:
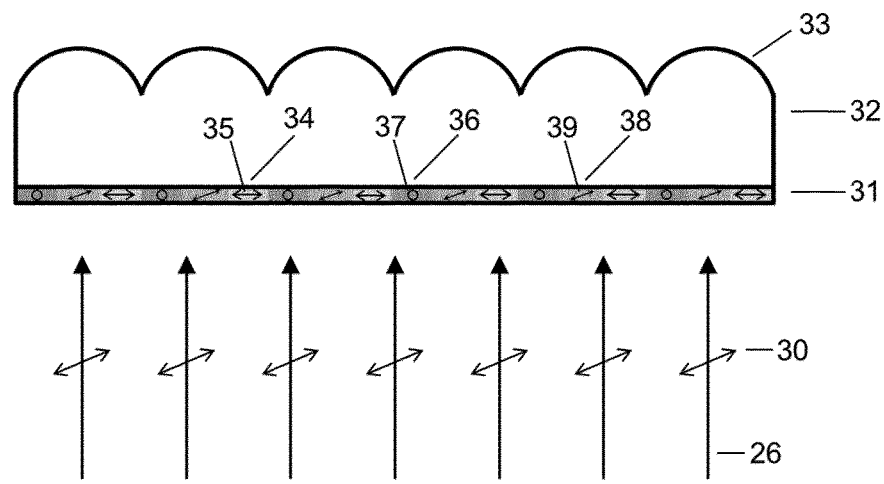
Figure 3E:
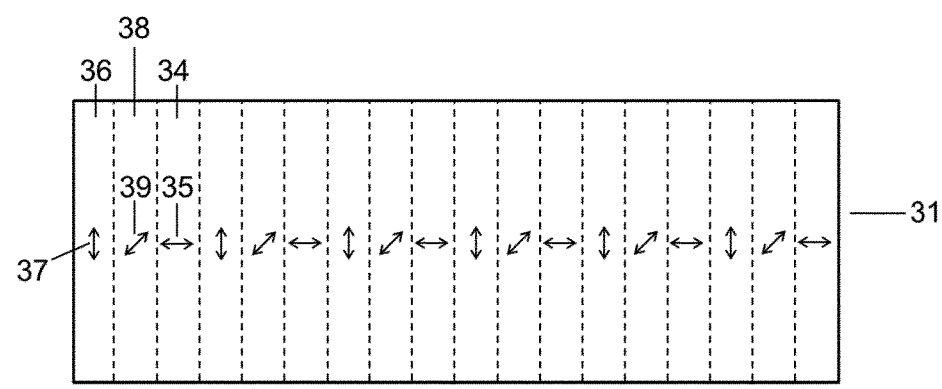

The drawings of FIGS. 2a to 2d depict another variant of the method according to the invention. Contrary to the example in FIG. 1, the POE 23 comprises a transparent substrate 22 with stripes of a light blocking material, thereby forming light transmitting sections 4 and light blocking sections 5 in the form of stripes. The transparent substrate 22 has a thickness that provides the desired parallax at the side opposite to the barrier pattern (the backside) for light with a certain incidence angle. Such a POE may, for example, be a transparent foil to which opaque stripes have been printed, for example using a dye, in particular a black dye. The photo-alignment layer 1 is combined with the POE 23. This may be done by directly generating the photo-alignment layer on the backside of the substrate 22, for example by a coating or printing method or by a lamination process. In FIG. 2b, collimated aligning light 6 is incident to the POE under a first incident angle 8, with regard to the normal of the POE surface. The polarization direction 7 of the aligning light is assumed to lie in the drawing plane. Because the light is blocked in the areas 5, the light transmitted through the transparent sections 4 creates anisotropy with an orientation direction 10 only in the first regions 9 of the photo-alignment layer. An additional irradiation step is depicted in FIG. 2c, in which the aligning light 26 does not pass the POE, but is irradiated directly to the alignment layer 1 on the backside of substrate 22. The circles 27 indicate a polarization direction perpendicular to the drawing plane, but any other polarization direction is possible. The aligning light 26 creates anisotropy in regions 11 of the photo-alignment layer 1 with an orientation direction 12 perpendicular to the already established orientation direction 10 in the first regions 9. As a result, an orientation pattern is created in the photo-alignment layer 1 having stripes 9 and 11 with orientation directions 10 and 12, respectively, which are perpendicular to each other, as shown in FIG. 2d. As in the example above, the two polarization directions of the aligning light in the two irradiation steps have been chosen for ease of illustration. However, any other combination of polarization directions may be chosen, in particular the two polarization directions do not need to be perpendicular to each other.

A third example of the method according to the invention is depicted in FIG. 3. The POE 32 in this example comprises an array of lenticular lenses 33 as shown in FIG. 3a. For the following description the term "front side" of the POE shall mean the side of the POE which exhibits the lenticular lenses, which is the upper part in FIG. 3a. For the opposite side of the POE 32, which is the lower part of the POE in FIG. 3a, the term "backside" shall be used. This terminology is for ease of description only and shall not imply any limitation to the scope of the invention. FIG. 3a further shows that the POE is combined with a photo-alignment layer 31. The photo-alignment layer is applied to the backside of the POE, for example by coating, printing or lamination. The geometry of the POE is such that upon a first irradiation of the POE with aligning light 6, which is incident under a first incident angle 8 and which has a first polarization direction 7, the aligning light is redirected to first regions 34, as depicted in FIG. 3b. The first polarization direction 7 of the aligning light is assumed to lie in the drawing plane. The aligning light causes anisotropy in regions 34 with an orientation direction 35. FIG. 3c illustrates a second irradiation of the POE with aligning light 16, which is incident under a second incident angle 18 and which has a second polarization direction 17. The second polarization direction 17 is assumed to be perpendicular to the drawing plane, which is indicated by the circles in FIG. 3c. In accordance with the geometry of the POE, the aligning light is redirected to second regions 36 of the photo-alignment layer, where it creates anisotropy with an orientation direction 37. The example of the method incorporates a third irradiation step, as illustrated in FIG. 3d. In the third irradiation step, the aligning light does not pass the POE but is irradiated to the backside of the POE, where the photo-alignment layer is attached to. The aligning light 26 may be incident perpendicular to the alignment layer plane and has a third polarization direction 30. Upon irradiation, anisotropy is created in the so far not exposed regions 38, with a third orientation direction 39. FIG. 3e shows the orientation pattern in form of stripes that has been created in the photo-alignment layer 31 by the three irradiation steps. There are three types of regions 34, 36, 38 defined by the corresponding orientation direction. The polarization directions indicated in FIGS. 3b to 3e, have been chosen as an example only and shall not limit the scope of the invention. Any other polarization direction would have been possible in any of the irradiation steps.

According to a first preferred embodiment of the method of the invention, a mask comprising a pattern of transparent and opaque areas is used to locally block the aligning light in order to irradiate only first zones of those regions selected by the incidence angle of the aligning light in accordance with the optical function of the POE.

If the mask is positioned in close contact to the photo-alignment layer and the aligning light has a high degree of collimation, then pattern structures even in the micrometer range can be ideally transferred to the photo-alignment layer. However, if pattern resolution in the micrometer range is not desired, a lower degree of light collimation and/or a larger distance of the mask from the photo-alignment layer can still provide sufficient reproduction quality. For example, it is possible to project the mask pattern to the plane of the photo-alignment layer even if the mask is separated from the photo-alignment layer by several centimeters, as long as the collimation degree is sufficiently high. Hence, there is some flexibility in the position of the mask with regard to the POE and the photo-alignment layer. The mask may be positioned between the POE and the photo-alignment layer, which allows close contact of the mask to the photo-alignment layer. However, it is preferred that the mask is positioned on the side of the POE opposite to the photo-alignment layer.

The aligning light then first passes the mask and then the POE before it hits the photo-alignment layer.

Preferably, the first preferred embodiment of the method comprises a second irradiation step, in which the mask is either removed, shifted or replaced and wherein without changing the mutual position and orientation of photo-alignment layer and parallax optical element, the parallax optical element is irradiated with aligning light of a second polarization direction, still under the first incidence angle, such that aligning light is directed to second zones within the first regions on the photo-alignment layer in order to induce anisotropy in the second zones with a different orientation direction than in the first zones. Accordingly, an orientation pattern is generated in the first regions of the photo-alignment layer. The number of zones with different orientation directions may be increased by adding third and further irradiation steps, each with a different polarization direction of the aligning light and different or shifted mask pattern or even without a mask.

The method may be further extended by first and optionally second and further irradiation steps for a second incidence angle of the aligning light. The first, second and further irradiation steps follow the description above, which means that the aligning light has different polarization directions in each of the irradiation steps. This generates an orientation pattern of the anisotropy axes within second regions on the photo-alignment layer.

If it is desired to pattern additional regions, then first, second and optionally further irradiation steps, as described above, may be applied for third and further incidence angles of the aligning light without changing the mutual position and orientation of photo-alignment layer and parallax optical element. The same mask may be used for irradiation under different incidence angles.

Preferably, there is one exposure step, in which aligning light is irradiated to the photo-alignment layer without passing the POE. The aligning light may be irradiated to the same side of the photo-alignment layer which is also irradiated through the POE. Preferably, the aligning light is irradiated to the side of the photo-alignment layer, which is opposite to that irradiated through the POE. The aligning light may be irradiated to the full area of the photo-alignment layer or only to certain zones of it. It is further possible to add one or more subsequent steps, in which further zones of the photo-alignment layer are irradiated with aligning light of different polarization directions. In order to define the zones to be irradiated in these exposure steps, photomasks can, for example, be used. Preferably, the polarization directions of the aligning light used for irradiation without the POE are different from each of those used for irradiation through the POE. The exposure steps with and without the POE may be in any sequence. For example, the first exposure step may be without the POE, followed by exposure steps with POE. Preferably, there is an exposure step without a POE after the last exposure step with a POE.

In the simplest case, there is only a first irradiation step with a POE for each incident angle of the aligning light, which generates anisotropy in certain zones of the corresponding region. The zones are defined by the pattern of the photo-mask, which preferably is different for each irradiation step. An additional irradiation without a POE and without a mask but with a different polarization direction of the aligning light than was used for the irradiation with the POE, generates anisotropy also in those zones of each region, which were not irradiated in the steps with the POE. As is known in the art, the anisotropy axis in zones, which are subsequently exposed to aligning light of two different polarization directions may substantially maintain the anisotropy axis direction, which has been established during the first exposure step, provided that the exposure energies of first and second exposure step are properly balanced, whereas the optimum balance may dependent on the nature of the photo-alignable material. If the same polarization direction of the aligning light has been applied for each incident angle of irradiation with POE, this results in an orientation pattern of the anisotropy axes having two types of zones, which differ by the direction of the anisotropy axes.

With the method of the first preferred embodiment it is possible to transfer information in the form of an orientation pattern to different regions of a photo-alignment layer. Since the different regions are individually exposed from different incident directions, the information transferred to the photo-alignment layer may be different for each incident angle.

With the method of the first preferred embodiment, it is in particular possible, to fabricate patterned photo-alignment layers with alternate stripes and different orientation directions, as those required for elements described in U.S. Pat. No. 7,375,888. The advantage is that the new method does not require exact positioning of the masks and, therefore, there is no need for register marks.

In a second preferred embodiment of the method of the invention, the aligning light is spatially modulated by an electronic spatial light modulator such as a transmissive or reflective liquid crystal display (LCD), a digital mirror device (DMD) or an organic light emitting device (OLED). The purpose of this embodiment is the same as in the first preferred embodiment, namely to modulate the aligning light such that only desired zones of each region are irradiated by the aligning light. Compared to the mask of the first preferred embodiment, which can be regarded as a static spatial light modulator, the electronic spatial light modulator has the advantage of a much higher flexibility with regard to the generation of a pattern, which represents information. Therefore, the use of an electronic spatial light modulator instead of the mask is in particular useful if devices to be produced each require individual information, since the light modulation pattern representing the information can be generated very quickly, without manufacturing of a mask. Since electronic spatial light modulators are employed in many products, in particular for projection applications, an apparatus comprising the light source, the spatial light modulator and the projection optics in a single housing may be used for providing the spatially modulated aligning light. Because the second preferred embodiment of the method is very similar to the method of the first preferred embodiment, the details and variants in the description of the first preferred embodiment apply also to the second preferred embodiment, except when referring to details of the mask.

Independent from the specific irradiation method, the anisotropy induced in a photo-alignment layer may further be transferred to a slave material, which is in contact with the photo-alignment layer. As a consequence, the slave material also exhibits anisotropic properties. A slave material may have been mixed with the photo-alignable material before exposing it to polarized light or is brought into contact with the surface of the photo-aligned material. Therefore, each of the above described embodiments of the method of the invention may be extended by additional steps, in which a slave material is applied on top of the photo-alignment layer, including optional heating and curing steps for establishing the anisotropic properties in the slave material and to initiate polymerization, for example by exposure to actinic light. The slave material may be applied by coating and/or printing but does not have to cover the entire area of the photo-alignment layer. Depending on the nature of the slave material, it may be helpful to perform the polymerization under inert atmosphere, such as nitrogen or vacuum.

If a slave material is included in the photo-alignment layer or applied on top of it, above methods may further comprise an additional step of removing non-polymerized materials from the slave material, for example by evaporation or dissolving in a solvent, in order to generate microstructures in the remaining layer. The slave material to be used in such a method may be designed such that phase separation of polymerized and non-polymerized material occurs upon initiating polymerization. For example, the slave material may comprise non-polymerizable liquid crystals.

In the context of the present application, a "slave material" shall refer to any material that has the capability to establish anisotropy upon contact with a photo-aligned material. The nature of the anisotropy in the photo-aligned material and in the slave material may be different from each other. For example, the slave material may exhibit light absorption anisotropy for visible light and therefore can act as a polarizer, whereas the anisotropy of the photo-aligned material may only be related to the molecular orientation. There may be also moieties of the photo-alignable material, for example in a co-polymer, which are not sensitive to aligning light, but create anisotropic properties because of interaction with the photo-sensitive moieties, which undergo a photo-reaction upon exposure to aligning light. Such a material exhibits properties of a photo-alignable material and of a slave material, but shall be included in the meaning of a photo-alignable material.

The properties that may be anisotropic in a slave material include the refractive index, absorption, luminescence, scattering and reflection.

A slave material may comprise polymerizable and/or non-polymerizable compounds. Within the context of the present application the terms "polymerizable" and "polymerized" shall include the meaning of "cross-linkable" and "cross-linked", respectively. Likewise, "polymerization" shall include the meaning of "cross-linking".

Preferably, the slave material is a self-organizing material. More preferred is that the slave material is a liquid crystal material and in particular preferred is that the slave material is a liquid crystal polymer material.

A liquid crystal polymer (LCP) material as used within the context of this application shall mean a liquid crystal material, which comprises liquid crystal monomers and/or liquid crystal oligomers and/or liquid crystal polymers and/or cross-linked liquid crystals. In case the liquid crystal material comprises liquid crystal monomers, such monomers may be polymerized, typically after anisotropy has been created in the LCP material due to contact with a photo-aligned material. Polymerization may be initiated by thermal treatment or by exposure to actinic light, which preferably comprises uv-light. A LCP-material may consist of a single type of liquid crystal compound, but may also be a composition of different polymerizable and/or non-polymerizable compounds, wherein not all of the compounds have to be liquid crystal compounds. Further, an LCP material may contain additives, for example, a photo-initiator, dichroic dyes or isotropic or anisotropic fluorescent and/or non-fluorescent dyes.

According to a second aspect of the invention there is provided a device comprising a POE and an optical element with patterned optical properties, wherein the pattern comprises at least one area, in which an optical property is anisotropic.

Preferably, the optical element has been manufactured according to the method of the invention described above.

Preferably the anisotropic optical property is the refractive index, the absorption, the luminescence, optical scattering or reflection. Most preferred, the anisotropic optical property is the refractive index or the absorption.

The term "information" as used in this application with regard to the devices shall cover any kind of coded or non-coded information that can be displayed, for example, in the form of text including microtext, images, photographs, graphics, logos and one- or two-dimensional bar codes.

Figure 4A:
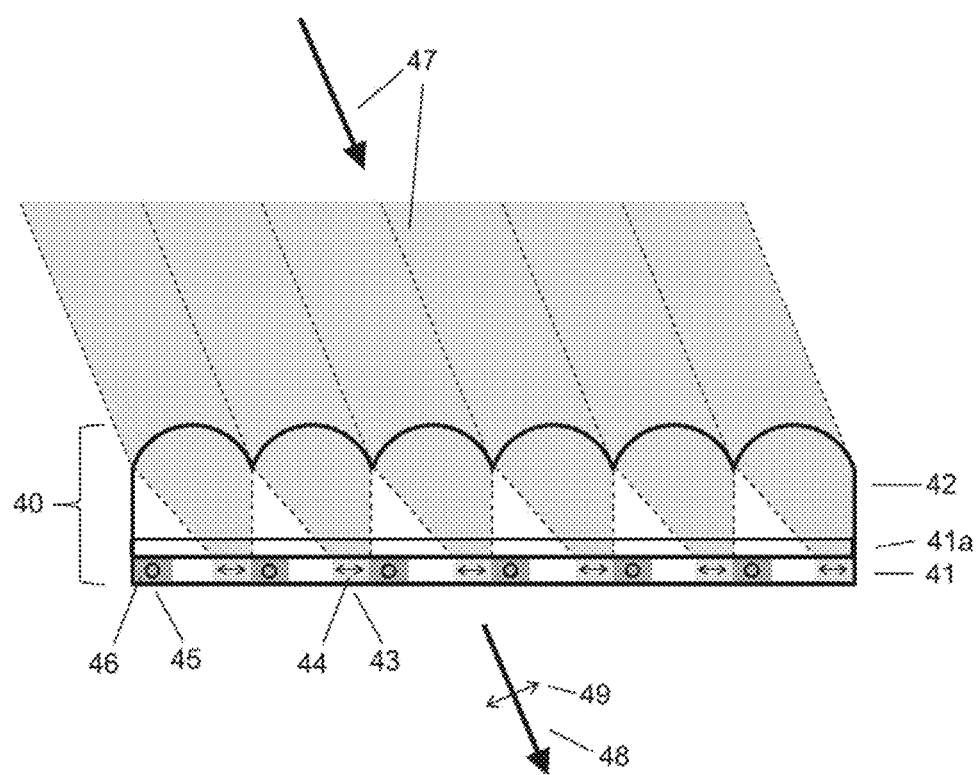
FIG. 4 shows a device according to a first preferred embodiment wherein the anisotropic optical element is not in the focal plane of the lenticular lenses of the POE.
Figure 4B:
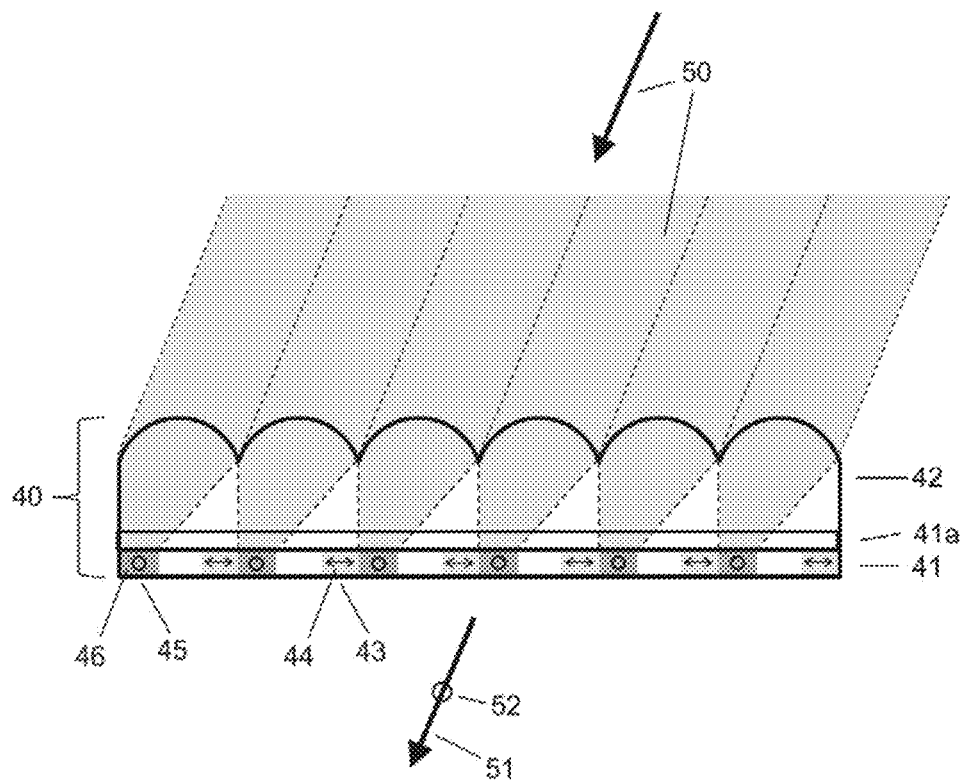

A first preferred embodiment of a device according to the invention is a polarizing device which polarizes non-polarized incident light with different polarization directions, depending on the incidence angle of the light. Any type of POE can be used for such a device. As an example, FIGS. 4a and b show cross-sections through a device 40 using a POE 42 with an array of lenticular lenses, wherein the POE 42 is combined with a photo-alignment layer 41a. The device further comprises a polarizing layer 41 with patterned optical properties, wherein the pattern has been generated by a photo-alignment method in the photo-alignment layer 41a and wherein the pattern comprises at least one area, in which the optical property is anisotropic, such as different polarizing directions 44, 46 in different regions 43, 45, which are preferably formed as stripes. There may be regions between regions 43 and 45, which may have no polarization function or have any polarization direction. If non-polarized light 47 is incident from a first direction from the POE side of the device, as illustrated in FIG. 4a, the light is directed to first regions 43 having a first polarization direction 44, which in FIG. 4a is assumed to lie in the drawing plane. The light 48 transmitted through these regions is being polarized according to this direction, which in FIG. 4a means that the polarization direction 49 is within the drawing plane. On the other hand, non-polarized light 50, incident from a second direction, as illustrated in FIG. 4b, is directed to regions 45 having a second polarization direction 46, which in FIG. 4b is assumed to be perpendicular to the drawing plane. The light 51 transmitted through these regions is then being polarized according to this direction, which in FIG. 4b means that the polarization direction 52 is perpendicular to the drawing plane, as indicated by the circle 52. The polarizing layer may be any type of polarizer. For example, it may be based on commercially available sheet polarizers, which have been processed to form regions of different polarization directions. This can, for example, be done by cutting stripes of different polarization directions and assembling them to form the patterned polarizer. Preferably, however, the polarizing layer 41 is a LCP layer comprising dichroic dyes, wherein different regions have been created by a patterned alignment surface, such as an alignment layer with an orientation pattern or a surface treated, for example, by imprinting, brushing, photolithography or other suitable methods to create a patterned orientation for an LCP material. Preferably, the alignment layer is a photo-alignment layer, which preferably has been aligned by the method of the invention.

Figure 5A:
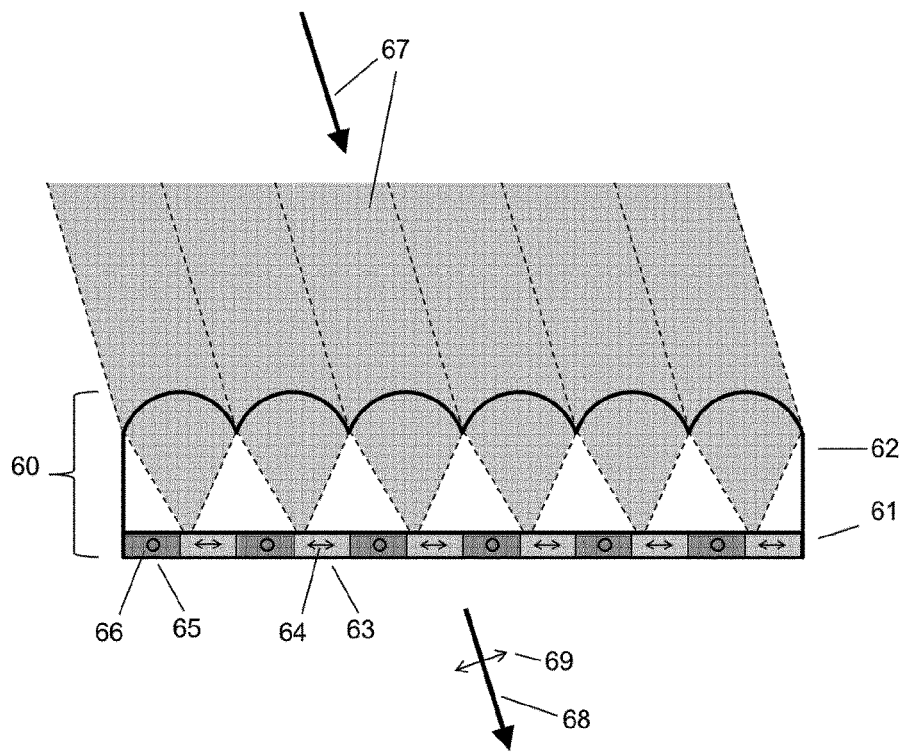
FIG. 5 shows a device according to a first preferred embodiment which works for a broad range of incident angles.
Figure 5B:
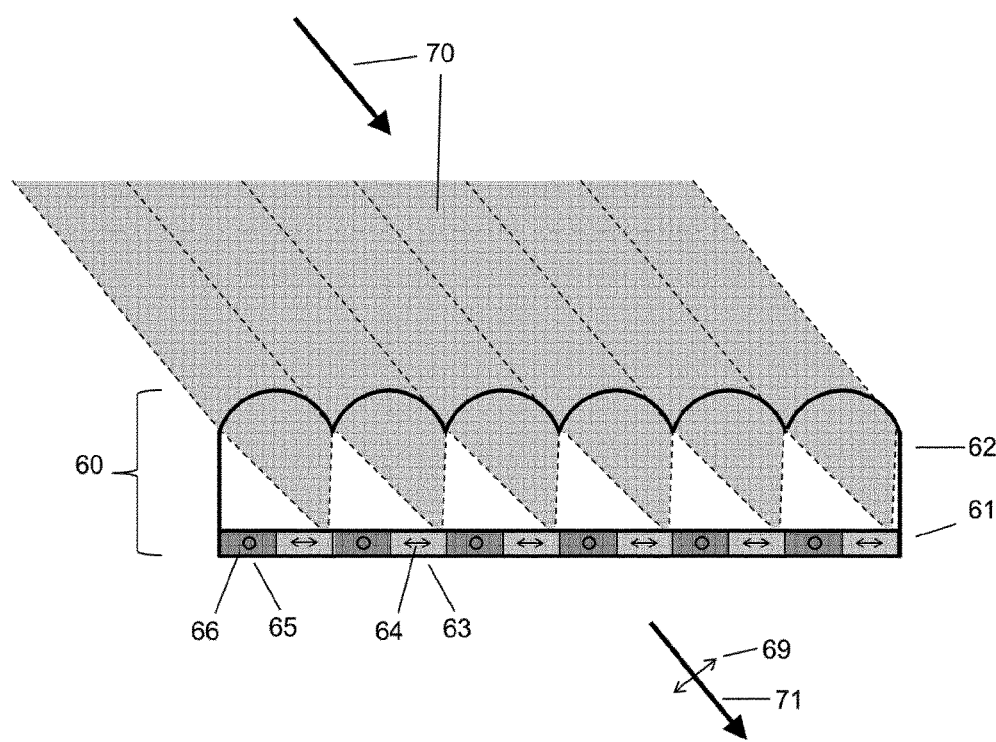

First and second directions of light for which the device of FIG. 4 works, are defined by the geometry of the POE as well as by the pattern in the polarizing layer. In the example of FIG. 4, the polarizing layer is not positioned in the focal plane of the lenticular lenses, which has the consequence that collimated light 47 and 50 is directed to the full width of stripes 43 and 45. If the pattern in the polarizing layer has been generated by a method according to the invention, wherein a photo-alignment layer was already attached to the lenticular lens array during irradiation with aligning light, then each type of stripes could have been created by a single irradiation with collimated light. The incidence angle dependent polarizer shown in FIG. 4, works only well for a small range of incidence angles. For other incidence angles, the areas on the polarizing layer to which the light is redirected do not fully coincide with the regions 43 or 45 anymore, so that the polarization degree of the transmitted light decreases. FIG. 5 shows a similar device 60 with a POE 62 having a lenticular lens array and in combination a polarizing layer 61 with regions 63 and 65 having polarization directions 64 and 66, respectively. The difference to FIG. 4 is that the regions with different polarization directions are broader and the polarizing layer is closer to the focal plane of the lenticular lenses. As a consequence, collimated incident light is redirected by the POE only to a small area of the stripes 63 and 65, respectively. For example, the non-polarized light 67 in FIG. 5a, incident under a first angle is redirected to a small area on the left of region 63, which causes the transmitted light 68 to be polarized with a polarization direction 69. Non-polarized light 70 in FIG. 5b, incident under a second angle is redirected to a small area on the right of region 63, which causes the transmitted light 71 also to be polarized with the polarization direction 69. The situation is similar for light incident from opposite directions, which will be redirected to regions 65 with another polarization direction 66. Hence the device 60 of FIG. 5 has a much broader range of incidence angles for which it works properly.

A device according to FIG. 5 can be manufactured using a method of the invention, by generating an orientation pattern in a photo-alignment layer which then, for example, transfers the orientation pattern to an LCP layer comprising dichroic dyes. The photo-alignment layer may be already attached to the POE during irradiation with aligning light. Because the focusing behavior of the lenticular lenses during irradiation of the photo-alignment layer is almost the same as it is in the final polarizing device 60, a single irradiation with collimated light would not be sufficient to generate the full width of the regions 63 and 65, respectively. Therefore, the irradiation of the photo-alignment layer during production may either employ multiple irradiation steps with aligning light incident under different angles or may use a single irradiation step with non-collimated aligning light, which provides a sufficient range of incidence angles.

The assumed polarization directions in the polarizing layers 41, 61 of FIGS. 4 and 5 are examples only and shall not be interpreted as a limitation. It is even possible to incorporate a multitude of regions with different polarization directions in a device described above. The number of possible polarization directions that can be selected by adjusting the angle of light incidence is determined by the number of regions with different polarization directions. The angle of incidence to be selected for a certain polarization direction depends on the geometry of both the pattern and the POE.

As is clear from the description and the related figures, a polarizing device as described above also works for light which enters the device from the polarizing layer side. Further, such a device can also be used as an analyzer, for example to analyze the polarization direction of linearly polarized light.

Figure 6:
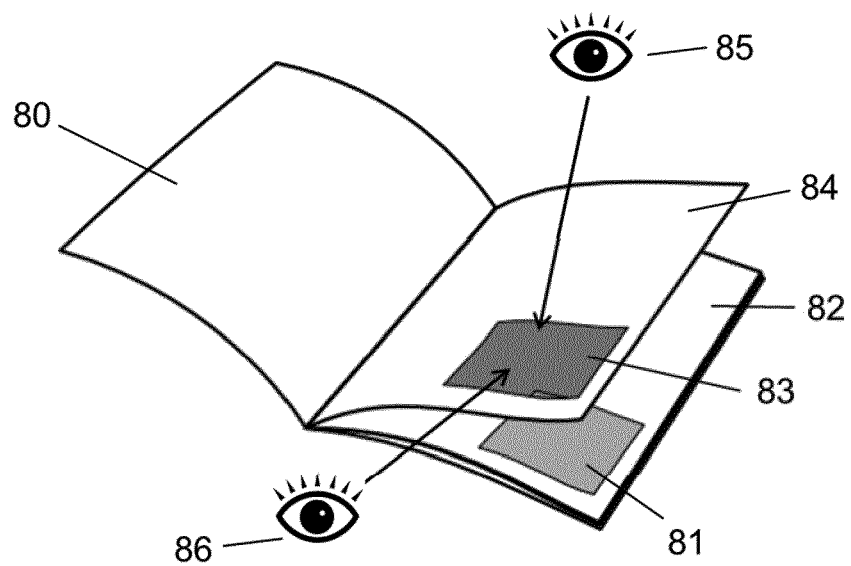
FIG. 6 shows an example, wherein a device according to the first preferred embodiment is incorporated in a booklet for analysing hidden information in a patterned retarder arranged on another page of the booklet.

Contrary to standard sheet polarizers, which, for example, have to be rotated by 90° to change from parallel to perpendicular polarization, a device according to the invention has only to be tilted to achieve the same, provided that regions with 0° and 90° polarization directions are available. Applications are, therefore, preferably those in which different polarization directions are desired, but rotation of a polarizer is restricted. For example, there are optical elements, in particular in the field of optical security elements, which comprise orientation patterned optical retarders and which when analyzed with a properly oriented standard sheet polarizer, show an image with positive contrast and which show the negative of the image upon rotating the polarizer by 45°. Such elements are similar to those disclosed in U.S. Pat. No. 7,375,888, already referred to in the introductory part of this application. Because not everybody has a sheet polarizer at hand for verifying such security elements, it would be advantageous to provide the polarizer together with the security element. This could be done, for example, by arranging the security element and the polarizer on the same substrate, for example a banknote, such that by folding the substrate, the polarizer can be used to analyze the security element. Another way to provide the polarizer together with the optical security element is to arrange the security element and the polarizer on two separate pages of a booklet, for example in a passport, such that the security element can be analyzed by turning the corresponding page in order to bring the polarizer in front of the security element. Transparent windows may be used to improve the visibility of the image to be observed. The drawback of the above applications is that the polarizer may hardly be rotated against the security element and hence the contrast inverted image cannot be observed. However, if in the above application examples a polarizing device according to the first preferred embodiment is used instead of a standard polarizing sheet, then upon arranging polarizer and optical element above each other, the hidden image stored in the security element can be made visible as positive and as negative image just by changing the angle of view or by tilting the substrate or booklet, respectively. FIG. 6 shows an example of a booklet 80 with a hidden image stored in a patterned retarder 81 on a first page 82 and in a transparent window on a second page 84 a device 83 according to the first preferred embodiment. The device preferably has two types of polarizing regions, which differ in the direction of polarization by 45°. As long as page 84 is not turned to cover page 82, the image stored in the element 81 is not visible. After turning page 84, the polarizing device 83 overlaps with the element 81 and the image stored in element 81 can be seen, for example, with a positive contrast when viewed from a first position 85 and with a negative contrast when viewed from a second position 86.

Figure 7A:
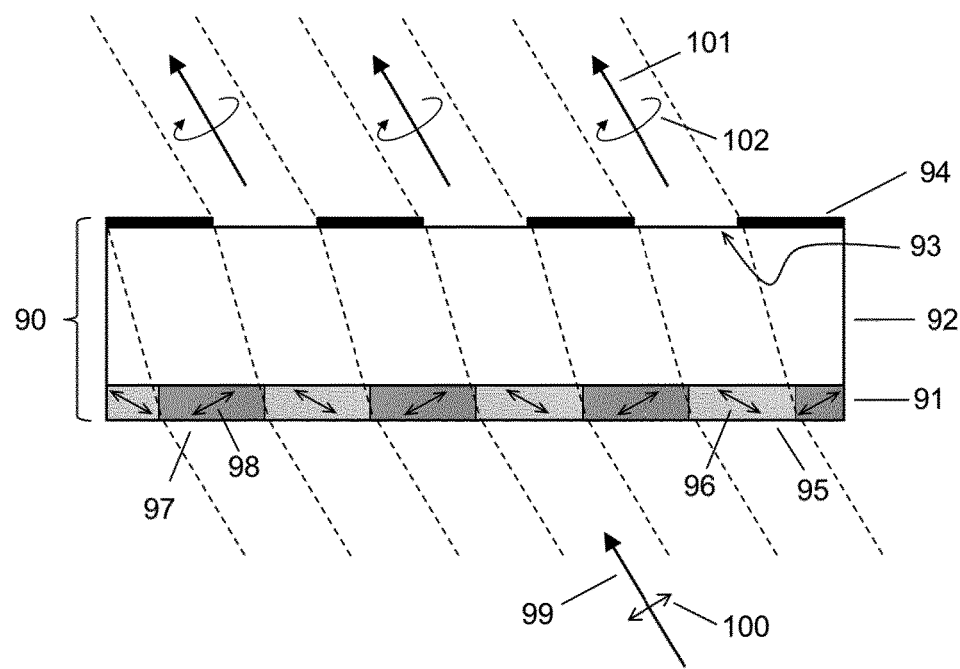
FIG. 7 shows a device according to a second preferred embodiment, wherein the optical element is a patterned retarder layer.
Figure 7B:
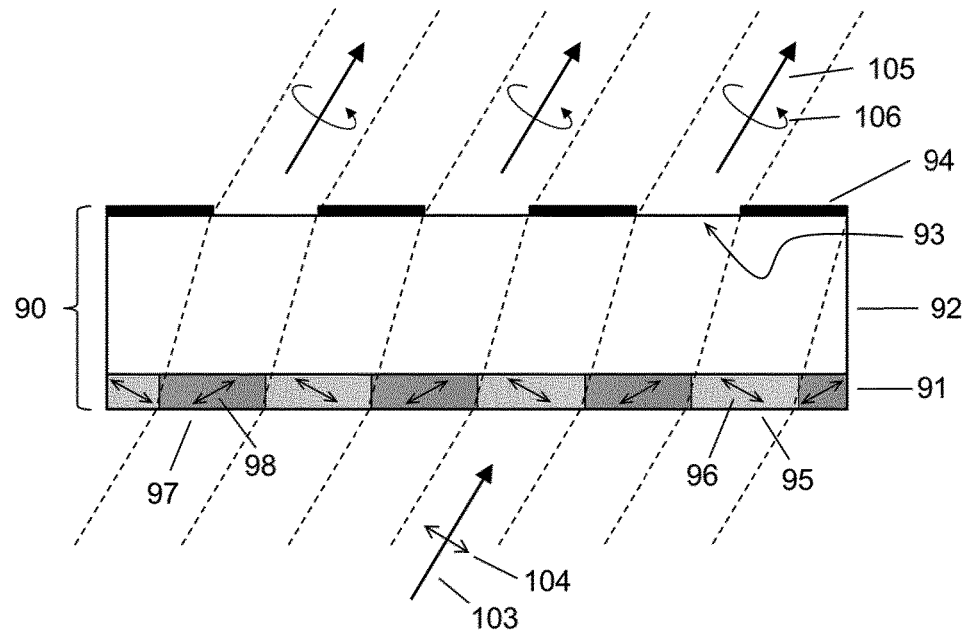

A second preferred embodiment of a device according to the invention is an optically retarding device, which provides different optical axes directions for light incident from different directions. Any type of POE can be used for such a device as long as it does not substantially change the polarization state of the light. The optical element is a patterned retarder layer with regions of different directions of the optical axes. As an example, FIG. 7 shows cross-sections through a device 90 comprising a POE 92 with a parallax barrier plate on top. If the POE comprises a dielectric material, such as glass or plastic, the refractive index of the dielectric material causes a change of the light path direction inside the POE, as indicated in the drawings of FIG. 7. The parallax barrier plate comprises transparent sections 93 and opaque sections 94, preferably in the form of stripes, which means that sections 93 and 94 extend along the direction perpendicular to the drawing plane. The device further comprises a retarder layer 91 with regions 95, 97 of different optical axes directions 96, 98. Preferably, the regions are formed as stripes. For the example in FIG. 7 it is assumed that the retarder layer acts as a quarter wave retarder for the incident angle the device is designed for. Light may be incident from the POE side or from the retarder layer side. In FIG. 7a it is assumed that linearly polarized light 99 is incident from a first direction onto the retarder layer 91 and that the polarization direction 100 lies in the drawing plane. It is further assumed that the optical axes of the retarder layer are not tilted with regard to the layer plane and that the directions 96, 98 are perpendicular to each other and oriented at an angle of 45° to the polarization plane of the incident light 99. Because the incident direction for light 99 is chosen such that light transmitted through regions 97 is blocked by the opaque sections 94 of the barrier plate, only light 101 is transmitted through the device, which has passed regions 95. The quarter wave property of the retarder layer 91 converts linearly polarized light into circularly polarized light of a first handedness 102, for example it may be left handed. FIG. 7b illustrates the situation where light 103 with a polarization direction 104, which lies within the same polarization plane as in FIG. 7a, is incident to the retarder layer from a second direction, such that light which passes regions 95 are blocked by the opaque sections 94 of the barrier plate. Accordingly, only light, which has passed regions 97 of the retarder layer is transmitted through device 90. Because regions 97 also act as a quarter wave retarder, the transmitted light 105 is again circularly polarized, but since the polarization direction 98 in region 97 is perpendicular to the polarization direction 96 in region 95, the handedness is opposite to that of light 101 of FIG. 7a, for example it is right handed circularly polarized. Hence, the device 90 converts linearly polarized light into left handed or right handed circularly polarized, depending on the incidence angle. For light incident from other directions than 99 and 103, both types of regions 95 and 97 contribute to the transmitted light, which in general will be elliptically polarized. Thus it is possible to tune the ellipticity of the transmitted light by changing the angle of incidence.

If both the light 99 and 103 is either left- or right handed circularly polarized, then the light 101 and 105, which is transmitted through device 90 is linearly polarized, with a polarization direction parallel and perpendicular to the drawing plane, respectively.

FIG. 7 is only a specific variant of the second preferred embodiment. As mentioned already above, other types of POEs could alternatively be used, such as a lenticular lens array. Further, for the retarder layer 91 any other value than a quarter wave may be used as a retardance; the number of regions with different optical axes directions may be different from two and any direction of the optical axis is possible. Another special case would be a device with a retarder layer that acts as a half wave plate. If for this case it is assumed that the optical axis direction 96 in region 95 is within the polarization plane of the incident linearly polarized light 99, whereas the optical axes direction 98 differs from direction 96 by an angle of 45°, then the device 90 in FIG. 7a would not affect the polarization state of incident light 99 in the effective areas and the light transmitted through device 90 would be linearly polarized with same direction 100. For polarized light incident from a second direction 103, corresponding to FIG. 7b, the linearly polarized light will be rotated by 90° upon transmitting the quarter wave retarder in regions 97, such that the polarization direction is perpendicular to the drawing plane of FIG. 7b. For this example, light incident from the two directions is transmitted as linearly polarized light, either polarized parallel or perpendicular to a reference plane. The person skilled in the art will appreciate that the number of regions with different optical axis directions may be different from two and that the optical axes directions may differ by any value, rather than only by 45°.

Preferably, a device of the second preferred embodiment comprises an additional patterned- or non-patterned polarizing layer, for example adjacent to the patterned retarder layer. The device can then, for example, be used as an angle dependent polarizer or analyzer.

Like for devices according to the first preferred embodiment, the devices of the second preferred embodiment may be applied for analyzing polarization states of light, for example by tilting the device or by changing the angle of view. In particular such devices are useful for visual observation of security elements which modulate the polarization state of light, such as the elements incorporating orientation patterned retarders.

A third preferred embodiment of a device according to the invention comprises a POE and an orientation patterned retarder layer, like in case of the second preferred embodiment. However, the orientation pattern differs from that of the second preferred embodiment, in that the different regions, which are optically effective for light of certain incidence angles, do not have a uniform orientation of the optical axes. Rather than that, the regions comprise zones, which differ by the directions of the optical axis. The optical axis direction of each zone can, for example, encode part of an information. The number of different optical axis directions is not limited. It is even possible that the optical axes direction changes continuously. In the context of this application an area comprising a continuous variation of optical axes directions shall be interpreted as a number of neighboring zones, wherein a zone is defined as a small area with almost uniform orientation of the optical axis. The information may, for example, be represented by the zones of all regions that are optically effective for a certain light incidence or observation angle. In this way, it is possible to store second and further information in second and further sets of regions, which can be selected by second and further incidence or observation angles, respectively. However, neither first, nor second information is visible in normal environmental lighting conditions, where the light is non-polarized. Even if the device is illuminated with polarized light, the information cannot be seen, since the information is only encoded by the optical axes of a birefringent layer, which causes a spatial modulation of the polarization state of light, for which the human is, however, not sensitive. The information stored in the device becomes only visible if the device is illuminated with polarized light and the transmitted light is observed through a linear or circular polarizer. Upon illumination with polarized light and with an analyzer in a proper position, the different information can be seen one after the other by changing the angle of observation or by tilting the device. A device according to the third preferred embodiment is, therefore, preferably used as an optical security device.

The angular range under which one information is visible depends on the geometry of the POE and of the pattern. For example, it is possible to enhance the viewing range for each of the information, by storing the same image for a number of incidence angles. In an extreme case, a first information is visible when looking to the device, for example, from the left side and a second information is visible when looking to the device from the right side. It is also possible to design the device such that both eyes of an observer see a different image, for example, two images which are combined in the human brain as a 3D-image.

Preferably a security device according to the invention is combined with other security features. In a simple case, the device may be combined with permanently visible information, preferably also different for different viewing angles. Without an analyzer only the permanent information is visible, whereas when observed with an analyzer, both the encoded and the permanently visible information can be seen in combination. As an example, the information encoded in the retarder layer may provide the respective parts of a 3D-image to left and right eye of an observer. Without an analyzer only the permanent information is visible. Upon arranging an analyzer in a proper position, a 3D-image appears, for example, at a distance above the permanently visible image.

Preferably, a device according to the third preferred embodiment is permanently combined with a polarizing sheet or layer in order to provide polarization means for incident non-polarized light.

The fourth preferred embodiment of a device according to the invention is similar to the third preferred embodiment in terms of storing information, but uses a patterned polarizing layer, as in the first preferred embodiment instead of a retarder layer. Similar to the third preferred embodiment, different information can be stored for different observation angles by encoding the respective information in zones of different polarization directions. While the encoding of information for different viewing angles and the application as security device is similar to that described for the third preferred embodiment, the way of analyzing a device according to the fourth preferred embodiment is slightly different. The difference is mainly related to the fact that the patterned anisotropic layer acts as a polarizer and therefore does not require both incident polarized light and an analyzer, but only one of them. For example, if the incident light is polarized, then the patterned polarizer of the device acts as an analyzer and controls local transmittance depending on the angle between the local polarization axis of the device and the polarization plane of the incident polarized light. On the other hand, if the incident light is non-polarized, then the light transmitted through the device is polarized and has a spatial modulation of the polarization direction. By using an analyzer the spatial modulation of the light is converted in a spatial brightness modulation, thus decoding the information, which becomes visible for an observer or detectable by a machine, respectively.

The fifth preferred embodiment of a device according to the invention is similar to the third and fourth preferred embodiment in terms of storing information, however, the patterned optical element comprises anisotropically absorbing and/or emitting fluorescent dyes, wherein the direction of maximum absorption and/or emission is different in different zones of the pattern. The direction of maximum absorption shall mean the direction in the layer plane, for which the absorption of light is maximum. The direction of maximum emission corresponds to the polarization direction of the emitted light. Similar to the third and fourth preferred embodiments, different information can be stored for different observation angles by encoding the respective information in zones of different anisotropy directions. Encoding of information for different viewing angles and the application as security device is similar to that described for the third and fourth preferred embodiments. For many applications it is preferred that there are at least two zones, for which the directions of maximum absorption and/or emission, respectively, differs by about 90°. In this case, the zones can be distinguished with maximum contrast. However, any other angle than 90° is possible, for example, to encode grey levels. Preferably, the optical element comprises a layer of patterned LCP, in which fluorescent molecules are embedded. If the fluorescent molecules absorb the exciting light anisotropically, then incident linearly polarized light of suitable polarization direction may be used for observation, which has the effect that those zones, which have a smaller angle between absorption and polarization direction absorb more light. On the other hand, zones in which the absorption axis is perpendicular to the polarization direction of the incident light have the lowest absorption. Because the intensity of the fluorescent light is higher the more exciting light is absorbed, the differently oriented zones fluoresce with different intensities. Thus, the information is visible for an observer without an analyzer. If the fluorescent molecules emit light anisotropically, which means the light is polarized, then it may be possible to illuminate the differently oriented zones with non-polarized exciting light, upon which the differently oriented zones fluoresce with different polarization directions, such that the stored information can be decoded by a linear polarizer.

If in the devices according to the invention a parallax barrier plate is used as a POE, the light blocking sections may also be reflective, in particular at the side towards the anisotropic optical element. In this case, the POE can be operated both in transmissive and in reflective mode. In transmissive mode, the light transmitted through the transmissive sections is the desired light and the device works as described for the preferred embodiments above. When operated in reflective mode, the light reflected at the reflective light blocking sections is the desired light, whereas the light transmitted through the transmissive sections may no longer be considered.

In case of devices according to the invention which are operated in reflective mode the observing light enters the device through the anisotropic element, which it passes a second time after being reflected at the reflective barrier. If the optical element is based on birefringent properties, which requires polarized light for observation, the parallax between the paths of the incoming and reflected light may cause interference between different zones of the optical element. This can be avoided if the reflective light blocking sections are either covered by a polarizer or comprise reflective polarizers. The incident light may then be non-polarized and will not interact with the birefringent material until it is polarized at the reflective sections of the barrier plate. Accordingly, only the reflected light will be polarized and can interact with the desired zones of the birefringent optical element.

In principle, the devices of the invention work for a large range of thicknesses. However, there are certain applications, which do not tolerate devices which exceed a certain thickness. Because parallax optical elements need a certain distance to generate the desired parallax, the POEs have to be especially designed for such applications. Preferably, the thickness of a device according to the invention is less than 100 µm, more preferred less than 60 µm and most preferred less than 30 µm.

If a parallax plate is used as a POE, it should have a proper distance from the element with patterned optical properties in order to provide a sufficient parallax effect in a reasonable range of viewing angles. The proper distance depends on the width of the light transmissive and light blocking sections of the parallax plate. If the space between the parallax plate and the element with patterned optical property is filled with air, then the distance between the parallax plate and the optical element is preferably larger than 0.2 times the width of a light transmissive section of the parallax plate. More preferred is that the distance is larger than 0.4 times the width of a light transmissive section and most preferred larger than 0.6 times the width of a light transmissive section of the parallax plate. However, if there is a dielectric material between the parallax plate and the optical element, such as glass or plastic, then the distance between the parallax plate and the optical element is preferably larger than 0.5 times the width of a light transmissive section of the parallax plate. More preferred is that the distance is larger than 0.8 times the width of a light transmissive section and most preferred larger than one time the width of a light transmissive section of the parallax plate.

A device according to the invention may be used in combination with other optical devices. In particular, if the optical element with patterned optical property is an optically retarding device, the pattern is not visible in normal, non-polarized light. Therefore, the POE of the device according the invention may be used for observation of another device without being disturbed by the pattern. The other device may, for example, also have a pattern, which in combination with the POE of the device of the present invention generates certain optical effects. The resulting effect may also be viewing angle dependent or may be a Moiré effect. The device according to the invention and the other device may be arranged on the same substrate, such as a banknote, so that by folding the substrate the two devices can easily be arranged above each other for the time of observation.

In any of the embodiments above, the orientation directions, which have been assumed as examples, shall not limit the scope of the invention. In principle, any other direction is possible, as long as not explicitly excluded.

A photo-alignable material in a photo-alignment layer for any of the methods and devices described above may be any kind of photo-sensitive material in which anisotropic properties can be created upon exposure to aligning light, independent from the photo-reaction mechanism. Therefore, suitable photo-alignable materials are, for example, materials in which upon exposure to aligning light the anisotropy is induced by photo-dimerization, photo-decomposition, trans-cis isomerization or photo-fries rearrangement. Preferred photo-alignable materials are those, in which upon exposure to aligning light the created anisotropy is such that slave materials in contact with the photo-aligned material can be oriented. Preferably, such slave material is a liquid crystal material, in particular a LCP-material.

Photo-alignable materials, as those described above, incorporate photo-alignable moieties, which are capable of developing a preferred direction upon exposure to aligning light and thus creating anisotropic properties. Such photo-alignable moieties preferably have anisotropic absorption properties. Typically, such moieties exhibit absorption within the wavelength range from 230 to 500 nm. Preferably, the photo-alignable moieties exhibit absorption of light in the wavelength range from 300 to 450 nm, more preferred are moieties, which exhibit absorption in the wavelength range from 350 to 420 nm.

Preferably the photo-alignable moieties have carbon-carbon, carbon-nitrogen, or nitrogen-nitrogen double bonds.

For example, photo-alignable moieties are substituted or un-substituted azo dyes, anthraquinone, coumarin, mericyanine, 2-phenylazothiazole, 2-phenylazo-benzthiazole, stilbene, cyanostilbene, fluorostilbene, cinnamonitrile, chalcone, cinnamate, cyanocinnamate, stilbazolium, 1,4-bis(2-phenylethylenyl)benzene, 4,4'-bis(arylazo)stilbenes, perylene, 4,8-diamino-1,5-naphthoquinone dyes, aryloxycarboxylic derivatives, arylester, N-arylamide, polyimide, diaryl ketones, having a ketone moiety or ketone derivative in conjugation with two aromatic rings, such as for example substituted benzophenones, benzophenone imines, phenyl-hydrazones, and semicarbazones.

Preparation of the anisotropically absorbing materials listed above are well known as shown, e.g. by Hoffman et al., U.S. Pat. No. 4,565,424, Jones et al., in U.S. Pat. No. 4,401,369, Cole, Jr. et al., in U.S. Pat. No. 4,122,027, Etzbach et al., in U.S. Pat. No. 4,667,020, and Shannon et al., in U.S. Pat. No. 5,389,285.

Preferably, the photo-alignable moieties comprise arylazo, poly(arylazo), stilbene, cyanostilbene, cinnamate or chalcone.

A photo-alignable material may have the form of a monomer, oligomer or polymer. The photo-alignable moieties can be covalently bonded within the main chain or within a side chain of a polymer or oligomer or they may be part of a monomer. A photo-alignable material may further be a copolymer comprising different types of photo-alignable moieties or it may be a copolymer comprising side chains with and without photo-alignable moieties.

Polymers denotes for example to polyacrylate, polymethacrylate, polyimide, polyamic acids, polymaleinimide, poly-2-chloroacrylate, poly-2-phenylacrylate; unsubstituted or with $C_1$-$C_6$ alkyl substituted poylacrylamide, polymethacrylamide, poly-2-chloroacrylamide, poly-2-phenylacrylamide, polyether, polyvinylether, polyester, polyvinylester, polystyrene-derivatives, polysiloxane, straight-chain or branched alkyl esters of polyacrylic or polymethacrylic acids; polyphenoxyalkylacrylates, polyphenoxyalkylmethacrylates, polyphenylalkylmethacrylates, with alkyl residues of 1-20 carbon atoms; polyacrylnitril, polymethacrylnitril, cycloolephinic polymers, polystyrene, poly-4-methylstyrene or mixtures thereof.

A photo-alignable material may also comprise photo-sensitizers, for example, ketocoumarines and benzophenones.

Further, preferred photo-alignable monomers or oligomers or polymers are described in U.S. Pat. Nos. 5,539,074, 6,201,087, 6,107,427, 6,632,909 and 7,959,990.

It should be understood that the intention is not to limit the invention to particular embodiments described. On the contrary, the intention is to cover all modifications, equivalents, and alternatives falling within the spirit and scope of the invention.

The invention claimed is:

1. A method for the generation of an orientation pattern in a photo-alignment layer, comprising,
   providing a photo-alignment layer (1, 31)
   providing a parallax optical element (3, 23, 32)
   arranging the parallax optical element in a proper distance from the photo-alignment layer
   irradiation of the parallax optical element with aligning light (6) of a first polarization direction (7) under a first incidence angle (8) with regard to a reference plane of the parallax optical element such that the aligning light is steered by the parallax optical element to first regions (9, 34) on the surface of the photo-alignment layer in order to induce anisotropy in the first regions of the photo-alignment layer
   irradiation of the parallax optical element with aligning light (16) of a second polarization direction (17) under a second incidence angle (18) with regard to a reference plane of the parallax optical element, without changing the mutual position and orientation of photo-alignment layer and parallax optical element, such that the aligning light falling on the same area of the parallax optical element as in the irradiation step with aligning light of the first polarization direction is steered by the parallax optical element to second regions (11, 36) on the photo-alignment layer (1, 31) in order to induce anisotropy in the second regions of the photo-alignment layer, wherein a photo-mask comprising a pattern is used in the irradiation step with aligning light of the first polarization direction to locally block aligning light such that only first zones of the first regions are irradiated, and wherein the parallax optical element is irradiated with aligning light under the first incidence angle but with a second polarization direction with or without a photo-mask, such that aligning light is steered to second zones within the first regions on the photo-alignment layer in order to induce anisotropy in the second zones with a different orientation direction than in the first zones.

2. The method according to claim 1, wherein the parallax optical element comprises microlenses, lenticular lenses (33) or a parallax barrier plate (3, 23).

3. The method according to claim 2, wherein a photo-alignment layer (1, 31) is combined with the parallax optical element (23, 32).

4. The method according to claim 1, wherein a photo-alignment layer (1, 31) is combined with the parallax optical element (23, 32).

5. The method according to claim 1, characterized by one or more additional irradiations steps, in which aligning light of additional polarization directions is incident under additional angles in order to generate alignment in additional regions.

6. The method according to claim 1, wherein a second irradiation step is applied under the second incidence angle of the aligning light, without changing the mutual position and orientation of photo-alignment layer and parallax optical element, and wherein the aligning light has a different polarization direction in the first and second irradiation step under the second incidence angle.

7. The method according to claim 1, characterized by an irradiation step, in which aligning light (26) is irradiated to the photo-alignment layer (1) without passing a parallax optical element (3, 23, 32), with a polarization direction (27, 30) different from polarization directions (10, 35, 37) used for irradiation using a parallax optical element.

8. An optical device (40, 60, 83, 90) comprising
a parallax optical element (42, 62, 92) combined with a photo-alignment layer and
an optical element (41, 61, 91) with patterned optical properties, wherein the pattern has been generated by a photo-alignment method in the photo-alignment layer and wherein the pattern comprises at least one area, in which the optical property is anisotropic and wherein the parallax optical element is arranged with a proper distance from the optical element such that there is a first and a second incident direction such that light incident onto the parallax optical element from the first incident direction is steered to first regions of the optical element having a first optical property and that light incident onto the same area of the parallax optical element from the second direction is steered to second regions of the optical element having a second optical property and wherein at least one optical property of the first region differs from that of the second region and wherein first and second regions are not identical.

9. The optical device according to claim 8, wherein the parallax optical element comprises microlenses, lenticular lenses or a parallax barrier plate.

10. The optical device according to claim 9, wherein the optical element with patterned optical properties is a patterned retarder (91).

11. The optical device according to claim 9, wherein the optical element with patterned optical properties is a patterned polarizer (41, 61).

12. The optical device according to claim 8, wherein the optical element with patterned optical properties is a patterned retarder (91).

13. The optical device according to claim 8, wherein the optical element with patterned optical properties is a patterned polarizer (41, 61).

14. The optical device according claim 8, wherein the optical element with patterned optical properties comprises a liquid crystal polymer.

15. The optical device according to claim 14, wherein the liquid crystal polymer comprises a dichroic and/or a fluorescent dye.

16. A booklet (80) comprising a patterned retarder (81) representing an image on a first page (82) and a device (83) according to claim 10 on a second page (84).

\* \* \* \* \*